US012440673B2

(12) United States Patent
Doan et al.

(10) Patent No.: US 12,440,673 B2
(45) Date of Patent: Oct. 14, 2025

(54) CURRENT CONTROL SYSTEM FOR SKIN TREATMENT DEVICE

(71) Applicant: NSE Products, Inc., Provo, UT (US)

(72) Inventors: DucToan T. Doan, West Jordan, UT (US); Dale G. Kern, Hyde Park, UT (US); Craig J. Wallace, Syracuse, UT (US)

(73) Assignee: NSE Products, Inc., Provo, UT (US)

( * ) Notice: Subject to any disclaimer, the term of this patent is extended or adjusted under 35 U.S.C. 154(b) by 480 days.

(21) Appl. No.: 17/897,303

(22) Filed: Aug. 29, 2022

(65) Prior Publication Data

US 2023/0124830 A1    Apr. 20, 2023

Related U.S. Application Data

(60) Provisional application No. 63/256,106, filed on Oct. 15, 2021.

(51) Int. Cl.
*A61N 1/36* (2006.01)

(52) U.S. Cl.
CPC ..... *A61N 1/36031* (2017.08); *A61N 1/36034* (2017.08)

(58) Field of Classification Search
CPC ............ A61N 1/36031; A61N 1/36034; A61N 1/3603; A61N 1/0476; A61N 1/328
See application file for complete search history.

(56) References Cited

U.S. PATENT DOCUMENTS

| 3,791,373 | A | * | 2/1974 | Winkler | A61N 1/3603 600/26 |
|---|---|---|---|---|---|
| 9,440,077 | B2 | | 9/2016 | Popovic et al. | |
| 10,046,160 | B1 | | 8/2018 | Kern | |
| 10,080,428 | B2 | | 9/2018 | Kern | |
| 10,661,072 | B2 | | 5/2020 | Kern et al. | |
| 10,765,199 | B2 | | 9/2020 | Kern | |
| 10,772,473 | B2 | | 9/2020 | Johnstone et al. | |
| 2007/0185431 | A1 | | 8/2007 | Kern | |
| 2014/0249466 | A1 | * | 9/2014 | Hakim | A61F 7/02 604/20 |
| 2020/0345970 | A1 | | 11/2020 | La Rovere et al. | |
| 2020/0406033 | A1 | * | 12/2020 | Loh | A61N 1/36007 |
| 2021/0162212 | A1 | | 6/2021 | Kern et al. | |
| 2021/0308452 | A1 | | 10/2021 | Kern et al. | |
| 2022/0133583 | A1 | | 5/2022 | Best et al. | |

OTHER PUBLICATIONS

Extended European Search Report dated Feb. 2, 2023 in connection with European patent application No. 22200018.4, 6 pages.
Examination Report dated Aug. 25, 2025 in connection with European patent application No. 22200018.4, 4 pages.

* cited by examiner

*Primary Examiner* — Jonathan T Kuo
(74) *Attorney, Agent, or Firm* — Dorsey & Whitney LLP

(57) ABSTRACT

A skin treatment device has one or more electrodes adapted for application of a current to a skin surface of a subject, a voltage or current supply configured to generate the current, and a controller configured to modulate the power output to the skin surface. The controller includes a monitor circuit configured to generate feedback responsive to a change in the power output to the skin surface, based at least in part on the current, and a control circuit configured to modulate the current, based on the feedback.

16 Claims, 9 Drawing Sheets

CURRENT CONTROL SYSTEM FOR SKIN TREATMENT DEVICE

CROSS-REFERENCE TO RELATED APPLICATIONS

This application claims priority to U.S. Provisional Patent Application Ser. No. 63/256,106, "Current Control System for Skin Treatment Device," filed Oct. 15, 2021, which is incorporated by reference herein, in the entirety and for all purposes.

FIELD

The application relates to power modulation and control for skin treatment systems. More generally, the application relates to systems, devices, processes and methods for controlling electrical power delivery in skin treatment, in order to improve user comfort while maintaining efficacy. Suitable uses include, but are not limited to, microcurrent, galvanic, and pulse modulated current treatments for cosmetic skin care and skin treatment, and other cosmetic and non-cosmetic applications adapted to address applicable regulatory requirements.

BACKGROUND

The skin covers the body's surface, forming a physical, insulating barrier to the environment, and protecting against foreign objects, insects and other foreign organisms. The skin also regulates body temperature and the passage of water and electrolytes, and includes nerves for touch, heat sensitivity, and other forms of physical sensation.

The outer or epidermal skin layer is formed of cells called keratinocytes, which form an environmental barrier and synthesize vitamin D. The epidermis also includes melanocytes, which produce melanin to protect against harmful UV radiation, Merkel cells, which provide sensitivity to touch, and Langerhans cells, a type of white blood cell or macrophage that protects the body against infection, as part of the immune system.

The epidermis surrounds the dermis. The structure of the dermis is provided by fibroblasts, which synthesize collagen and elastin proteins to form the extracellular matrix, with collagen fibers to provide strength and toughness, and elastin threads or filaments to provide elasticity and flexibility. The fibroblasts also produce proteoglycans, viscous proteins that provide hydration and lubrication, and regulate ionic binding and molecular transport. The dermis also includes macrophages and mast cells, part of the immune system, as well as the hair follicles, sweat and oil glands, nerve cells, and blood vessels.

The epidermis and dermis make up the cutis. Subcutaneous tissue connects the cutis to the underlying muscle and fascia, and to other connective tissue including the periosteum (covering the bones). The subcutis also includes elastin and adipose (fat) cells. Skin health, in turn, depends on all of these components, from the subcutaneous tissues to the outer layers of the epidermis.

A range of personal skin care products have been developed to help maintain skin health and vitality, including devices for cleansing, exfoliating and smoothing the outer epidermal layers, and products to improve firmness and elasticity associated with the production of Type I collagen, elastin, proteoglycans, and other components of the extracellular matrix in the dermis, and below. Healthy skin can also exhibit better strength and elasticity, provide enhanced environmental protection, promote immune response, and provide cosmetic benefits including coloration, tone and overall appearance.

Advanced skin care devices also employ current-based treatments, including both galvanic systems, operating to enhance topical delivery, and micro-current-based (pulsed) electrical waveforms, which can also stimulate the skin tissue itself. The skin's response to electric current flow, however, involves a number of complex and interacting biological processes, and can trigger a range of user sensations. As a result, there is an ongoing need for more advanced current control techniques, including techniques to continuously monitor and control current levels to improve treatment efficacy, while maintaining user comfort, and, where appropriate, reducing treatment time requirements.

SUMMARY

A skin treatment device is disclosed with one or more electrodes adapted for application of a current to the skin surface of a subject. A voltage or current supply can be configured to generate the current for application via the one or more electrodes; e.g., where power is output to the skin surface. A controller can be configured to modulate the power output, for example using a monitor circuit configured to generate feedback responsive to changes in the power output, based at least in part on a voltage detected at or across one or more of the electrodes.

The controller can include a control circuit configured to modulate the current based on the feedback, for example with a level control adapted to modulate the current via a non-linear current control device. Methods for operating such a device are also encompassed, along with non-transitory computer-readable media with program code executable to operation such a device.

DETAILED DESCRIPTION

Figure 1:
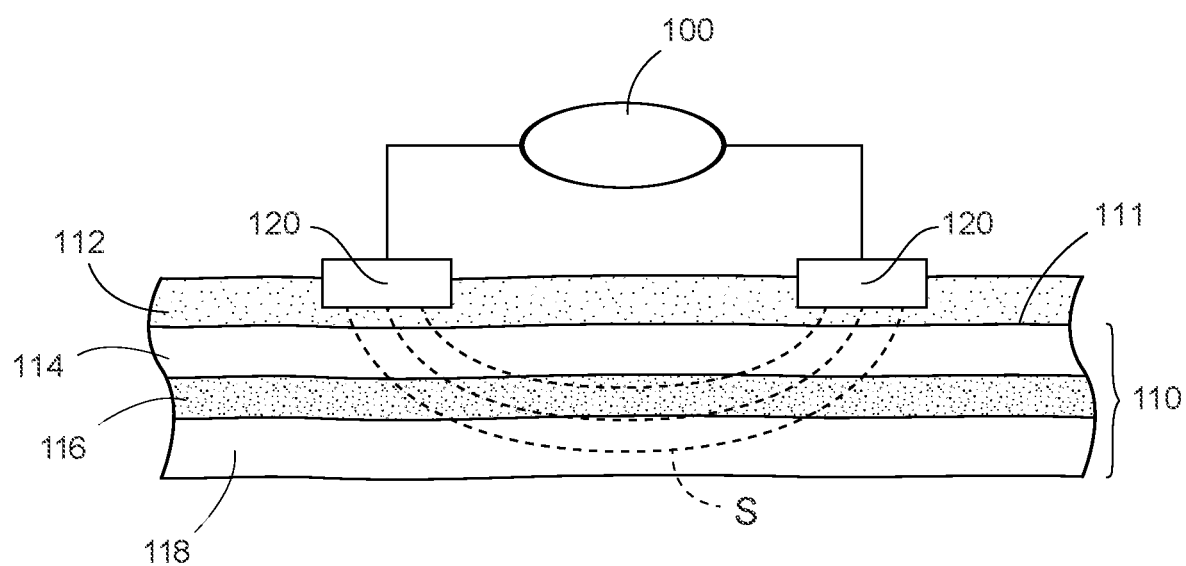
FIG. 1 is a sectional diagram illustrating application of a device to deliver a current treatment.

Although the present disclosure describes particular examples and preferred embodiments of the invention, persons skilled in the art will recognize that changes may be made in form and detail without departing from the scope of the claims. The various examples and embodiments are also described with reference to the drawings, where like reference numerals represent similar structural and functional components throughout the several views. These examples and embodiments do not limit practice of the invention as claimed; rather, the specification merely sets forth representative applications to different systems, methods and devices, and practice of the invention is not limited except as set forth in the appended claims.

Overview

This disclosure describes how the electrical output from a skin treatment device can be conditioned for user comfort, while maintaining treatment efficacy. The solution is crafted without prior art design limitations that can decrease maximum voltage and/or current output levels, reducing device efficacy, while maintaining other beneficial operational characteristics.

Traditional galvanic, microcurrent (or similar) skin treatment devices generally utilize constant current sources to aid delivery of topical agents into the skin, or to otherwise promote skin health, vitality and wellness. Users of prior art devices, however, may sometimes experience stinging or prickling sensations, which in some cases can induce a likelihood of discomfort. In response, designers have sometimes provided adjustable level settings, which can electronically reduce the current or voltage output, at the discretion of the user.

Unfortunately, some adjustment level settings may also decrease the effectiveness of the device, for example by reducing the current below a level required to maintain efficacy. In order to provide a more effective solution, which allows the device to operate at greater (or maximum) effectiveness, while also providing a positive user experience, a continuously acting "constant comfort control" function is introduced to regulate the device's electrical power output. Suitable applications include, but are not limited to, galvanic, microcurrent, TENS (transcutaneous electrical nerve stimulation) and iontophoresis-based skin treatment devices, for example as described in U.S. Publications No. 2007/0185431 A1, 2021/0162212 A1, and 2021/0308452 A1, and U.S. Pat. Nos. 10,046,160 B1, 10,080,428 B2, 10,765,199 B2, and 10,772,473 B2, each originally assigned to NSE Products of Provo, Utah, and all of which are incorporated by reference herein, in the entirety and for all purposes.

A constant current power source has output characteristics that can deliver a constant current to a load despite changes and variances in the resistance. The practical output performance of these sources, however, is limited by the voltage used to supply the source, and as defined by the resistance according to Ohm's Law.

Additionally, the output power is non-uniform, as it depends on the electrical resistance of the load. This relationship is defined by the following power equation:

$$P = I^2 \times R, \quad (1)$$

where I is the current output, R is the resistance, and P is the electrical power delivered to the load (e.g., the user's skin). Alternatively, $$P = I \times V, \quad (2)$$

where the voltage V=I×R, again according to Ohm's law.

When a galvanic (or similar) current-based device is used on the skin, the equivalent resistance characteristics continuously change depending on skin thickness, moisture level, the presence (or absence) of topical agents and facial or body hair, and other characteristics. In some cases, these changes in resistance R can be abrupt, and occur rapidly, resulting in a similarly rapid change in the voltage V and power output P, as the source tries to maintain the current I at a constant value.

These "hyperpolarization" events can expose the skin to significant power differential transients, which have been associated with stinging or prickling sensations, and (in some cases), a likelihood of user discomfort. Some factors that contribute to hyperpolarization events (including rapid voltage and/or power fluctuations) include the electrical properties of the device, the speed at which the device moves across the skin surface under treatment, the skin contact surface area, the applied pressure, dryness and moisture level of the skin, skin thickness, and location of the treatment area, among other factors.

FIG. 1 is a sectional diagram illustrating the application of a skin treatment or skin care device 100 to deliver an electrical stimulus or current treatment S to the skin 110 of a subject, for example the user of the device 100. The device 100 can also be applied the subject's skin 110 by a skin care technician, treatment specialist, or other person.

As shown in FIG. 1, the skin treatment device 100 includes one or more electrodes 120 adapted for applying the current treatment S to the surface 111 of the subject's skin 110, for example in combination with a topical agent 112 as shown, or as applied directly onto the skin surface 111. The skin (or "cutis") 110 extends from the skin surface 111 through an epidermal layer (or epidermis) 114, to a lower dermal layer (dermis) 116. The subcutis (or hypodermis) 118 comprises the subcutaneous tissues, underlying the cutis 110.

The dermis 116 includes an upper papillary layer and a lower reticular layer, formed of more loosely arranged and denser collagen fibers, respectively. The collagen fibers extend from the dermis 116 through the subcutis 118, forming connective tissues (fascia) that attach the skin (cutis) 110 to the underlying muscle, and other connective tissue. The subcutis 118 also includes adipose tissues, for example in the form of lipocytes (fat cells) and intracellular or intercellular lipids, which form between the collagen fibers. A network of small blood vessels or capillaries provides circulation, extending from the subcutis 118 into the dermis 116.

Depending on application, the current stimulus S can be generated by one or more electrodes 120 disposed along the skin surface 111. A topical agent 112 can be applied to the skin surface 111 to improve conductivity, and to provide the skin 110 with nutrients and other beneficial agents (e.g., in the form of a gel, fluid or other skin treatment material).

As shown in FIG. 1, the current stimulus S can propagate through the skin surface 111 to the top epidermal layer 114, and through the epidermal layer 114 to one or both of the dermis 116 and subcutis 118. The stimulus S can thus promote a range of beneficial responses in the epidermal, dermal (cutaneous) and subcutaneous tissues.

The current treatment S can be applied as a steady-state (constant or alternating) voltage signal; e.g., in the form a galvanic treatment, or using a modulated waveform, for example a pulsed microcurrent waveform generated by two or more electrodes 120 spaced along the skin surface 111. One or more of the electrodes 120 can also be disposed on or adjacent the skin surface 111 in a selected treatment location, for example on the face, arm, torso or leg, with another electrode 120 coupled remotely, for example via contact with the hand of the user, or elsewhere on the subject's body.

In more advanced devices, control circuitry is provided to regulate the applied current treatment S, in order to maintain efficacy and promote ion transport and other beneficial effects. In each of these applications, there is a tradeoff between user/subject comfort and treatment efficacy, based on the applied current level. Current control can also complicated by skin conditions including dryness, the presence or absence of topical agents and facial or body hair, and other skin conditions that can affect conductivity across different regions of the skin surface to be treated by the device 100. To address these problems, a continuous, comfort-based current control system can be employed, using a feedback loop for electrical power conditioning in a range of galvanic, microcurrent, TENS, and iontophoresis-based skin treatment devices, as described herein.

Figure 2:
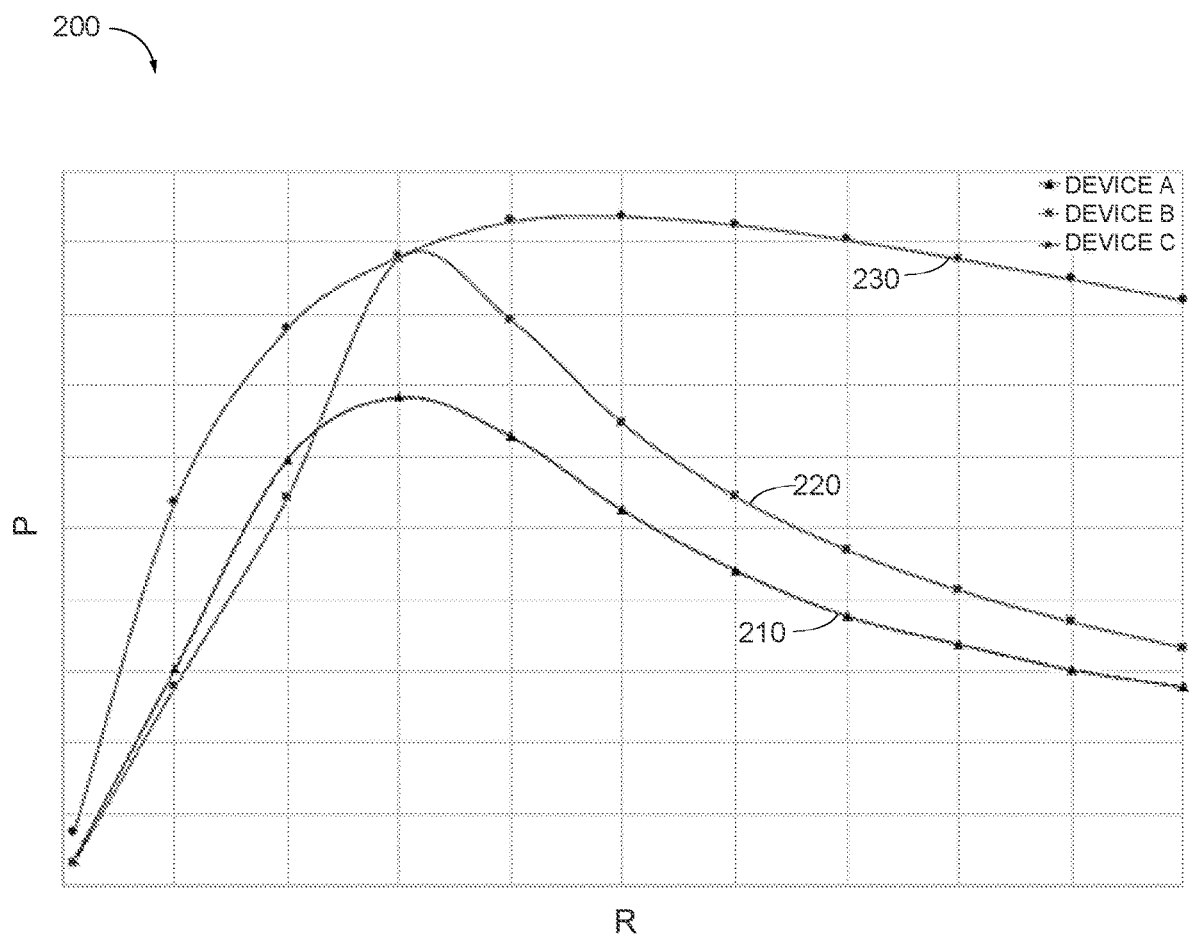
FIG. 2 is a plot of power output versus skin resistance, for three representative skin treatment devices.

FIG. 2 is a plot (200) of power output versus resistance, for three representative skin treatment devices A (line 210), B (line 220), and C (line 230). Power output (or "skin power") P is shown on the vertical axis, with skin resistance R on the horizontal, both in arbitrary units.

In this example, when prior art devices A and B encounter a dry skin spot or other sudden change in skin resistance (e.g., in a range from about 30 k$\Omega$ to about 70 k$\Omega$), the current sources may approach their maximum current settings, exposing the subject to an unregulated transient power differential (e.g., of about 1.5 to 2.0 mW, or more). Power differentials in these ranges have been observed to cause stinging and prickling sensations, up to and including user discomfort.

This problem can be addressed by providing a continuously acting power modulation and control function, which is able to regulate the electrical power output during hyperpolarization and other transient events. This contrast with traditional constant current sources, which may be unable to regulate power output during hyperpolarization events and other rapid transients, without resorting to absolute device performance limitations.

These absolute limitations, such as user-selectable fixed current levels or "one time" maximum settings, act to reduce a device's maximum current output in a preselected range, for example by 25% to 75% or more, which can significantly reduce the device's overall effectiveness. In order to provide a more effective solution that allows the device to operate at higher or maximum effectiveness while also providing a positive user experience, the electrical source can be regulated to provide a more constant power output.

Device C (line 230) of FIG. 1 represents such a device (e.g., a galvanic device or similar skin treatment device), using such a constant power source. As seen from the much flatter response curve of line 230, such a device can be much better suited to regulate power output during a hyperpolarization event, or other rapid change in resistance and/or power output.

Based on this practical example, device C can better regulate power output over a similar change of more than a factor of two in skin resistance (e.g., from about 30 k$\Omega$ to about 70 k$\Omega$), with a much smaller overall power differential (e.g., less than about 0.25 mW, as compared with 2 mW and 1.5 mW transients for devices A and B). Additionally, device C was able to deliver and maintain substantially higher power levels across a wider resistance range.

Figure 3A:
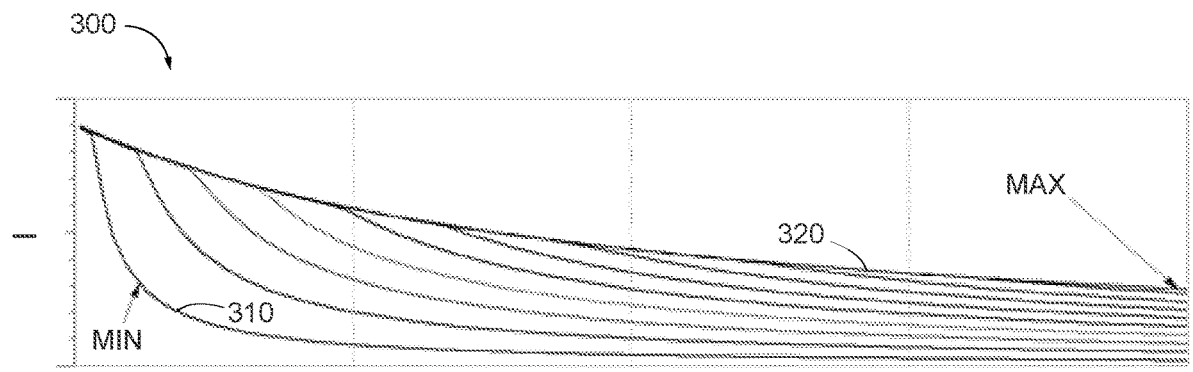
FIG. 3A is a plot of current versus skin resistance, for different current control parameters.

FIG. 3A is a plot (300) of current versus skin resistance, for different current control parameter (or "throttle") values ranging from MIN (line 310) to MAX (line 320). Current I is shown on the vertical axis and skin resistance R on the horizontal, both in arbitrary units.

Figure 3B:
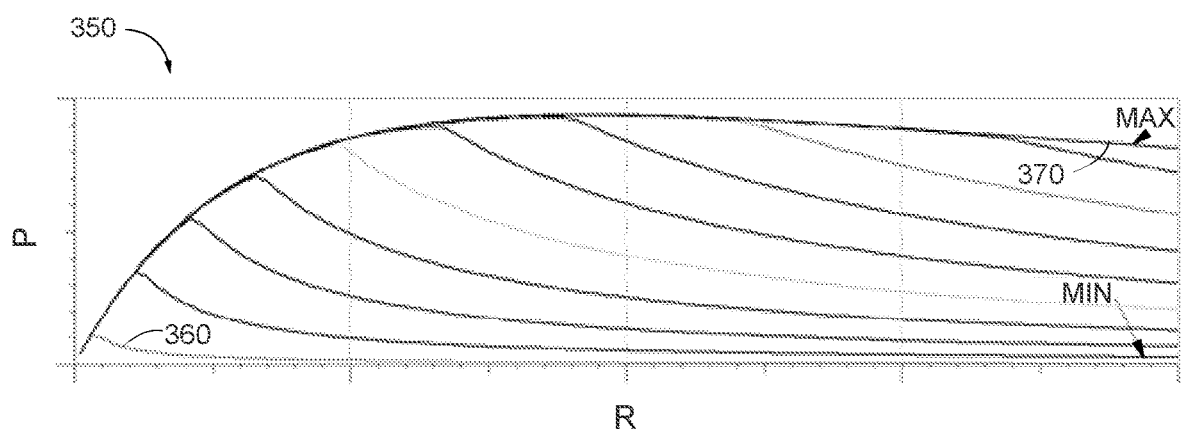
FIG. 3B is a plot of power output versus skin resistance, for the current control parameters of FIG. 3A.

FIG. 3B is a plot (350) of power output versus skin resistance, for the current control parameter values ranging from MIN (line 360) to MAX (line 370), according to FIG. 3A. Power output P is shown on the vertical axis and skin resistance on the horizontal, both in arbitrary units.

As shown in FIGS. 3A, the current curves are conditioned to vary in a non-linear fashion as skin resistance increases and decreases. The current curves are not constant, and the current changes dynamically in a non-linear fashion with skin resistance. The curves also demonstrate a much higher dynamic range, depending on the selected control parameter, between the minimum value (line 310) and the maximum value (line 320).

The non-linear current change can be adapted to resemble a square law function, or otherwise to provide a more substantially constant power output over a wider range of different resistance values R, as shown in FIG. 3B. This technique of electrical current modulation prevents or reduces the incidence of sudden transient power states, and results in a more dynamic power range, represented by the different power curves between the minimum "throttle" or control parameter value (line 360), and the maximum control parameter value (line 370).

As shown in FIG. 3B, sudden power transient states no longer exist. Instead, the power rises more smoothly to a maximum, and drops off slowly toward a constant or asymptotic value. This contrasts with device A (line 210) and device B (line 220) of FIG. 2, where the power levels have high peak values (e.g., at 4.5 kW or more), increasing from a rapid ramp up range with a high slope for resistances R below the peak value, and more quickly ramping down after the peak value.

In FIG. 3A, the peak current curves exhibit a gentler increase, reflecting the non-linear response. Furthermore, rather than exhibiting a sudden drop in power as shown for devices A (line 210) and device B (line 220) of FIG. 2, which may be associated with a physiological skin response (e.g., tingling, prickling, or discomfort), the power curves in FIG. 3B approach a constant or asymptotic value in the higher resistance range (e.g., up to 100 k$\Omega$ or more). This more carefully controlled, constant power source modulation also provides for a greater dynamic range, as described above, and is less prone to skin sensation or discomfort associated with sudden power transients.

Although the instance of sudden power transient states can be reduced or substantially eliminated by application of a constantly modulated power source, the subject may still be subject to a tingling or stinging sensation associated with hyperpolarization events due to abrupt resistance changes; e.g., due to erratic skin contact with the electrodes, the presence or absence of a topical agent, or the skin surface itself becoming more or less conductive.

When a microcurrent or galvanic source is placed across the skin, the skin will typically become more conductive after a certain amount of current exposure, or after a given exposure time. When this occurs, and the current is substantially constant, the voltage across the electrodes will decrease, due to Ohm's Law (V=I×R).

When the voltage starts to decrease (e.g., as the skin becomes more conductive), a skin sensation may begin. If the decrease in voltage is rapid, this may be considered a hyperpolarization event. Skin prickling and stinging or discomfort may thus occur when the skin becomes less resistive over a relatively short time period, as associated with hyperpolarization events.

When there is a sudden increase in voltage, rather than a decrease (that is, a hyperpolarization event caused by a rise in resistance due to a dry spot on the skin, or if the user has established poor electrode contact with the skin surface), skin sensations may also occur. More generally, skin sensations and discomfort can be associated with hyperpolarization events regardless of how the hyperpolarization event is caused, and whether the voltage and power are substantially increased or decreased. In order to address these events and further improve user comfort, additional conditioning of the power source output can be applied.

Power Modulation Circuit Design

To counteract skin sensations, the constant power source modulation may vary the power levels in accordance with the voltage changes, as described above. To achieve this, a control parameter or "throttle" values is determined to control the output power level.

This mechanism can be adapted to throttle back (reduce) the power output to minimum value or range, whenever a hyperpolarization event occurs, in order to prevent or reduce skin sensation, and the potential for discomfort. After the power is reduced, the throttle or control parameter can be applied to more slowly increase the power, back toward the maximum value allowed or defined by the constant power supply modulation.

In order to design a more substantially constant power supply for skin treatment, a non-linear (e.g., square law or power law-like output) control circuit is adapted for the current source. The non-linear source control can be manipulated or conditioned with a range of analog and/or digital components that exhibit suitable square law or power law response.

For example, a diode could be utilized to shape the current behavior in a substantially square law fashion, by driving the diode in the "knee" region, with a non-linear (power law) response. A transistor can also be used, for example a field effect transistor (FET) or a junction-gate field-effect transistor (JFET), or another three-terminal device. In these applications, the device can also be driven toward or into the breakdown or inverted "knee" region, in order to obtain the desired power-law response curve shape.

Figure 4:
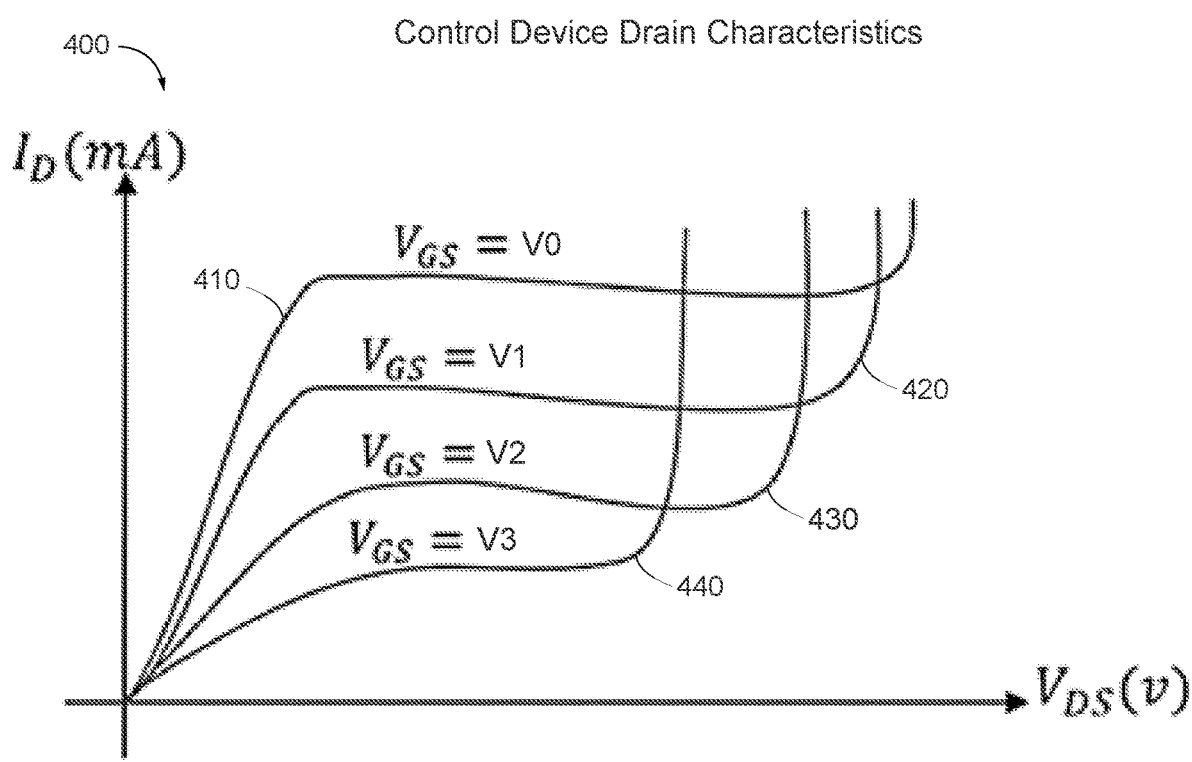
FIG. 4 is a current-voltage plot illustrating drain characteristics of a current control device.

FIG. 4 is a current-voltage plot (400) illustrating drain characteristics of a current control device, for example a JFET or other three-terminal device. The drain current $I_D$ is shown on the vertical axis, unscaled, for example in milliampere (mA), or other suitable units. The drain source voltage ($V_{DS}$) is shown on the horizontal axis, also unscaled, for example in volts (V), or other suitable units. Response curves are shown for representative input gate source voltages $V_{GS}$; e.g., $V_{GS}$=V0 (line 410), ±V1 (line 420), ±V2 (line 430), and ±V3 (line 440); e.g., depending on device polarity and other device characteristics.

As shown in FIG. 4, the response curves increase to a generally flat or linear region in the middle of the plot, and then increase in the inverted knee region, approaching breakdown. The output current (drain current $I_D$) exhibits a non-linear (e.g., power-law) response in the knee region, making the device suitable for controlling or modulating the current output in a skin treatment device. Due to having a control gate, the output current can also be modulated at different levels, as desired for a mode complete constant current control design.

Figure 5:
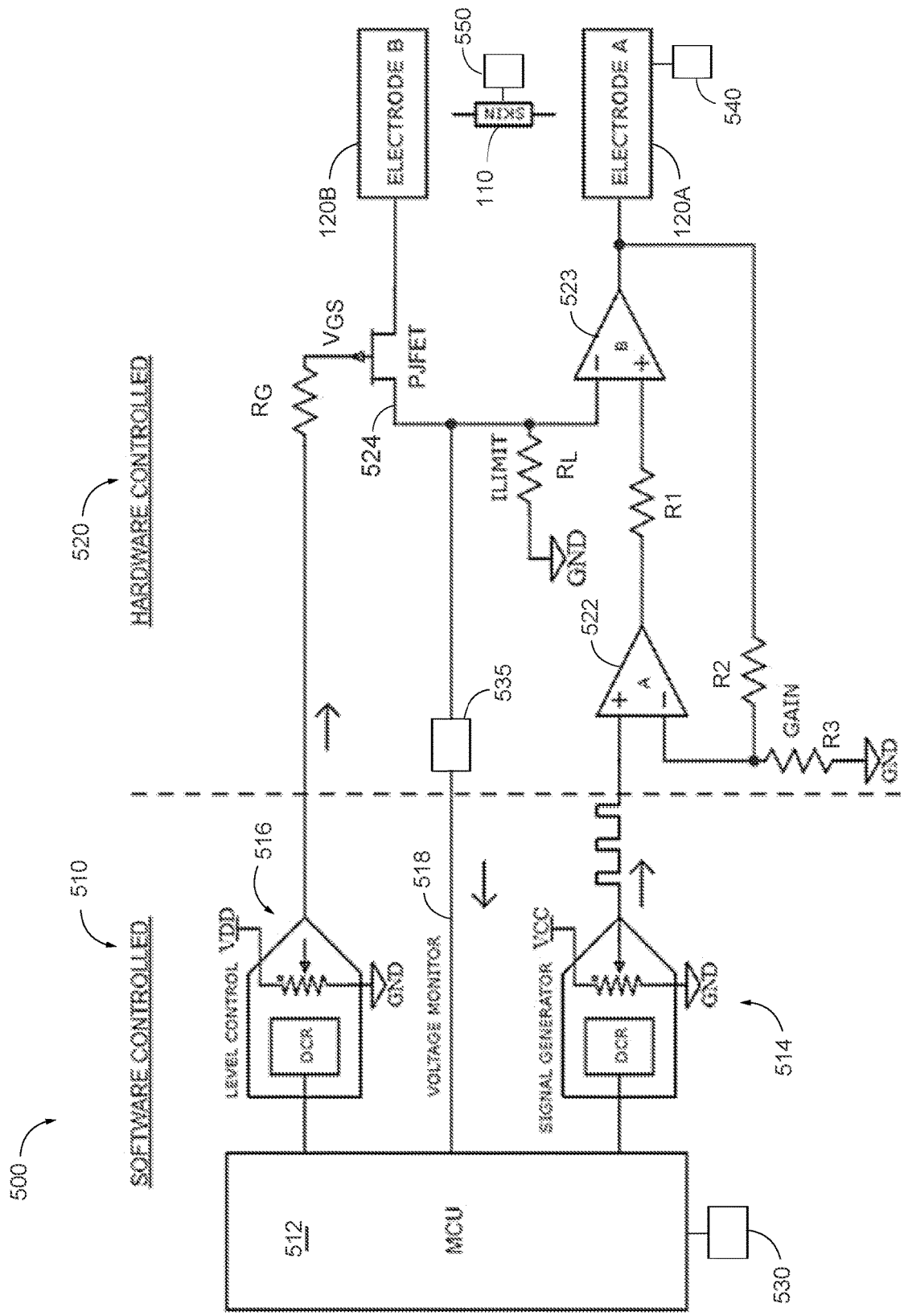
FIG. 5 is representative electronic schematic illustrating a current control circuit; e.g., using a device according to FIG. 5.

FIG. 5 is electronic schematic illustrating a representative current controller or control circuit 500; e.g., for use with a control device operating according to FIG. 4. As shown in FIG. 5, control circuit 500 is divided into a software controller section 510, and a hardware control section 520.

Software side (or section) 510 of control circuit 500 includes a programmable microprocessor or microcontroller (MCU) module 512, a signal generator 514, a level control (or control circuit) 516, and a voltage monitor or feedback circuit 518. Hardware side (or section) 520 includes a sequence of operational amplifiers (op amps) 522, 523 coupled to a first electrode 120A (electrode A), and a current control device 524 coupled to a second electrode 120B (electrode B); e.g., operating according to FIG. 4, or another suitable three-terminal or non-linear device 524. Electrodes 120A, 120B are adapted to provide a current stimulus to a subject's skin 110, which is modulated by control circuit 500 to reduce power transients and increase user comfort while maintaining treatment efficacy, as described herein.

The hardware section 520 of control circuit 500 operates continuously; e.g., in an analog mode. The software-controlled section 510 operates sequentially, based on a digital sampling rate of the signal generator 514, which is coupled to electrode A via the op amps 522, 523, utilizing a series of resistors R1, R2, R3 to control feedback and determine the gain. The signal itself can be generated as a modulated waveform for applying a microcurrent treatment, or a galvanic signal, as described above.

The level control 514 is coupled to the current control device 524 via a resistor $R_G$, generating gate voltage $V_{GS}$. The feedback circuit 518 is connected between the (second) op amp 523 and the current control device 524, with a current-limiting resistor (ILIMIT) $R_L$ connected to ground (GND). The MCU 512 in control circuit 500 can be adapted to measure the voltage drop across the current limiting resistor $R_L$ in FIG. 5); e.g. a fixed value resistor. The software routines coded into (or for operation of) the MCU 512 can be adapted to translate this voltage reading into a current level using Ohm's law, for example a microamp (µA) or milliamp (mA) reading, or other suitable scale. These readings are then digitized and fed into moving average filters with short and long-term averaging rates, which contain the running average of the respective samples (e.g., the last nine and thirty samples, respectively, or at other suitable sampling rates such as the last two to ten samples and the last ten to fifty samples, or more or less). See FIG. 7.

In order to maintain a more constant power control while preventing or avoiding skin sensations associated with discomfort due to transients, control circuit 500 is adapted to provide a power control parameter or signal to the current control device 524; e.g., ranging from a minimum value (MIN) to a maximum value (MAX), as described above. In operation of the circuit 500, the parameter value or level can be shifted up or down based on the voltage monitor (or other feedback signal) from circuit 518; e.g., using a voltage sensor 535 coupled to the second terminal of the control device 524 and connected to the microcontroller 512; e.g., in the form of an analog to digital converter (ADC). Alternatively, a suitable voltage sensor 535 can be integrated into the microcontroller 512.

While the control circuit 500 may not directly measure power per se, power has a mathematical relationship that is defined by the skin resistance and the amount of current applied. While the resistance of the skin 110 is determined independently of operation of the control circuit 500, the hardware section 520 actively regulates the power applied to the skin 110. The hardware power regulation is further enhanced through the software-controlled section 520; e.g., by measuring the voltage and/or skin current via the feedback circuit 518, and conditionally controlling the power levels applied to the skin 110 based on the feedback signal, via the gate voltage $V_{GS}$ provided to the control device 524.

The output shifting is done by manipulating the gate input voltage $V_{GS}$ of the current control device 524. For example, if the gate voltage $V_{GS}$ is set at −V3 according to FIG. 4, the current level output by device 524 will be lower than when the gate voltage $V_{GS}$ is set at V0. This shifting of control parameter values corresponds to the shifting of current and power levels between the minimum (MIN) and maximum (MAX) curves, as shown in FIGS. 3A and 3B. In other words, by manipulating the gate voltage $V_{GS}$ at device 524, the power levels can be established and shifted to reduce transient effects, and to increase the dynamic range of the current output.

Additional Feedback Features

To further address hyperpolarization events and transients, one or more of the following features can also be included, either in the constant power supply modulation circuit 500, or elsewhere on the device, and coupled in data communication with the MCU 512, e.g., via the feedback circuit 518.

An accelerometer or velocity sensor/detector 530 could also be employed as part of the feedback circuit 518. When the user moves the device too quickly, poor electrode contact can occur, causing a hyperpolarization event. In this case (e.g., when a preselected velocity or acceleration value is reached or exceeded), the power modulation circuit 500 can be adapted to alert the user, and to throttle back (reduce) the power output until the movement returns to a regular, recommended range for velocity and/or acceleration.

One or more pressure sensors 540 can be adapted to sense proper contact between one or more of the electrodes 120A, 120B and surface of the skin 110, for example based on a predefined range for force or loading on the electrode surface. In the case of improper contact (force or loading outside the predefined range), the system can alert the user and/or throttle back (reduce) the power output, until such time recommended pressure is re-established (force or loading within the predefined range).

A skin temperature sensor 550 could be employed to accomplish additional feedback for the power modulation circuit 500, in order to help prevent or reduce hyperpolarization events. In these examples, the skin temperature sensor could also be used to modulate the feedback voltage according to a predefined function relating skin temperature and skin sensitivity, or relating the skin temperate and resistance.

Figure 6:
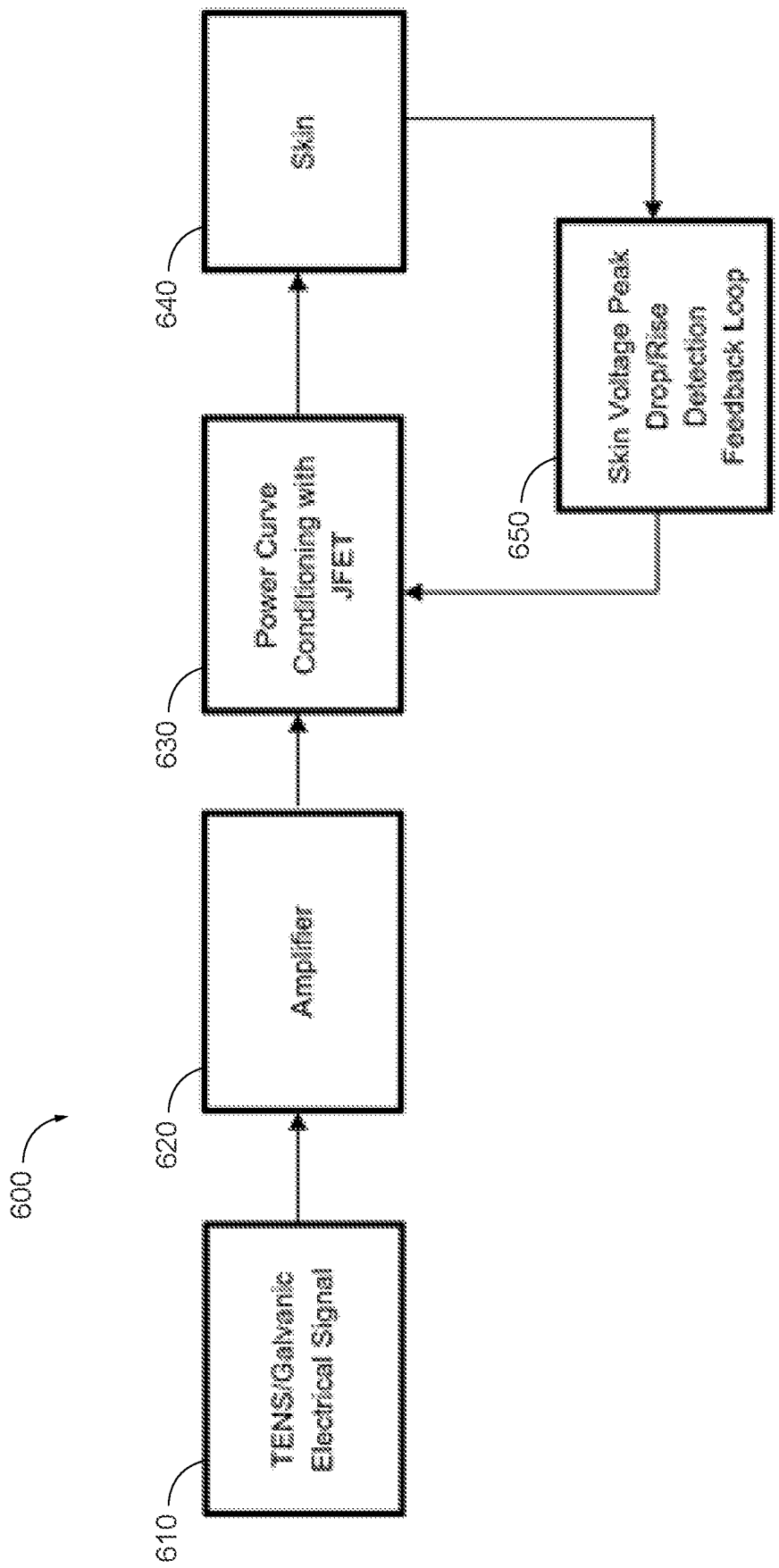
FIG. 6 is a block logical diagram for current control, for example as illustrating operation of a current control circuit according to FIG. 5.

FIG. 6 is a block logical diagram or control logic (600) for current control, for example illustrating operation of a control circuit 500 according to FIG. 5. As shown in FIG. 6, control logic 600 includes generation of a suitable current signal (block 610), amplification (block 620), power modulation (block 630), application to a subject's skin (block 640), and a feedback loop (block 650).

The current signal (block 610) can be generated by signal generator 514 of FIG. 5, for example as a galvanic current or pulse microcurrent signal, or a TENS signal. The signal can be amplified via one or more amplifiers 522, 523, using a suitable feedback arrangement to determine the gain, as described above (block 620).

Power modulation/curve conditioning (block 630) can be accomplished with a non-linear current control device 524 as shown in FIG. 5, for example a transistor, JFET or other three-terminal device 524. The current and power response to changes in resistance can be determined using a level control 516 to determine a "throttle" value or similar power control parameter, which is used to determine the gate voltage $V_{GS}$ on the control device 524. In particular examples, a positive-junction P-JFET or PJET may be used, as shown in FIG. 5, or control circuit 500 may be adapted for use with a negative-junction N-JFET or NJFET, or other suitable non-linear control device 524.

The term "throttle" is used to describe the voltage potential $V_{GS}$ applied to the gate of the PJFET or other non-linear control device 524; e.g., through A resistor $R_G$, as shown in FIG. 5. Maximum throttle represents a lower or minimal input gate-voltage potential, whereas minimum throttle represents a higher or maximum input gate-voltage potential. This inverse voltage control logic is constrained by the characteristics of the chosen PJFET, or other non-linear control device 524. Practically speaking, level control 516 can be configured or adapted to vary the input gate-voltage potential $V_{GS}$ in a range suitable for the selected control device 524; e.g., between 10 V and 30 V for a particular PJFET device 524, as shown in FIG. 5. An NJFET or other FET device can also be used, or another non-linear device such as a transistor or similar three-terminal device 524. Depending on application, the voltage control can be inverse or direct, and the applied voltage range will vary accordingly.

The modulated and conditioned current signal can be applied to a subject's skin using one or more electrodes 120A, 120B (block 640). A feedback loop (block 650) is used to determined changes in the control value, for example based on a voltage feedback circuit 518, or using an accelerometer or velocity sensor 530, a pressure sensor 540, or a skin temperature sensor 550, as described above.

Figure 7:
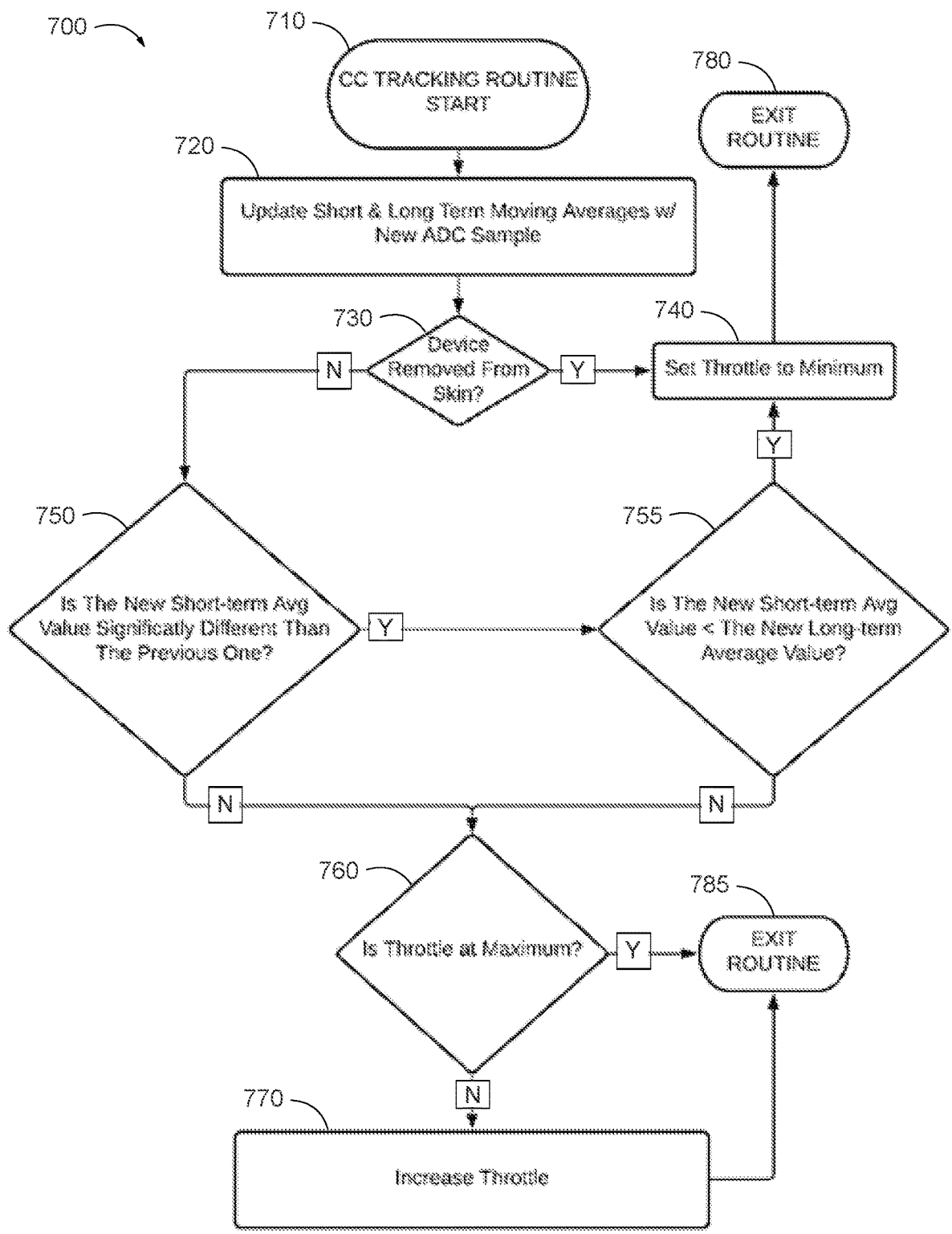
FIG. 7 is a flow chart for current control; e.g., illustrating operation of a control logic according to FIG. 7.

FIG. 7 is a flow chart for current control; e.g., illustrating a method 700 of operating a control logic 600 according to FIG. 6. As shown in FIG. 7, the constant power modulation or current tracking routine starts at step 710, and proceeds to updating short and long term moving averages of the feedback signal, for example an analog to digital conversion (ADC) of a voltage feedback, as shown in FIG. 5.

As evident from FIG. 7, the current-control tracking routine 700 can be called each time a new ADC sample of the current waveform (or other current or voltage output) is taken. For microcurrent, TENS, and other waveform-based systems, ADC samples can be taken at specific times during the waveform generation (e.g., three samples per half cycle, during the "on" phase of pulse generation, or two, four, or more samples, or at another suitable rate). For galvanic systems, ADC sampling can take place at suitable periodic or aperiodic intervals. Practically speaking, the rate of sampling can also be changed to increase or decrease the responsivity of the software-controlled section of the control circuit, or to accommodate changes to the waveform shape or frequency.

The short term average may include, for example, one, two or more pulse trains or sequences for a microcurrent device, e.g., a 10-60 millisecond (ms) pulse sequence, or longer, and sampling at one, two, three or more pulses per sequence. The long-term average can include three, four, five, six or more pulse sequences, with a similar sampling rate. A TENS waveform can be similarly sampled, while a galvanic waveform can be sampled at similar regular or irregular intervals, for example up to 30 samples every 1.2 second, or at a higher or lower rate.

Removal of the device from the skin can be detected (step 730) by a substantial and prolonged increase in voltage, corresponding to lack of current path through the subject's skin, or via a pressure sensor adapted to sense the reactive force on the electrode surface. If the device is removed (branch "Y"), the control value is set to the minimum value (step 740), reducing the current and power curves to their lowest range, and exiting the routine (step 780), until the next ADC sampling cycle; e.g., to determine whether the device was inadvertently detached or temporarily removed during a skin treatment, or intentionally removed in order to end the treatment cycle. In these cases, the routine 700 can also be restarted when the device is replaced onto or adjacent the skin surface, for example using the voltage feedback signal or a pressure sensor to detect skin contact, or whenever device is turned back on and used again (step 710).

While the device is coupled to the skin surface (not removed; branch "N"), the new short-term average value of the feedback signal can be compared to the previous value (step 750), in order to determine a substantial or significant difference, which could indicate a change in skin resistance and/or power output. If the change is significant (branch "Y"), for example corresponding to change in current of 20 μA or more, or a relative change of 5%, 10%, 20% or more, the new short term and long-term average values can be compared, to determine the direction of change (step 755). Depending on the direction, the current control ("throttle") value can be set to minimum (branch "Y"), utilizing the lower current and power output response curves to avoid transients; e.g., as shown in FIGS. 3A and 3B.

If there is no substantial change in the short term averages, or if the direction and amount of the change is suitable (branches "N"), the current control parameter ("throttle") can be checked against its maximum value (step 760). If maximum value has already been reached (branch "Y"), the routine can exit (step 785). If not (branch "N"), the value be increased (step 770) before exiting (step 785), until the next tracking/control sequence begins (step 710). While steps 780 and 785 represent independent exit points, method 700 can also be executed iteratively, with or without an explicit exit (step 780, 785), and with or without an explicit start or restart (step 710), before cycling back to update the moving averages (step 720).

In operation, upon startup (block 710) a suitable MCU or other control processor can be adapted to sample feedback and digitize the signal at a particular rate (block 720); e.g., the voltage drop across a fixed-value current limiting resistor, as shown in FIG. 5, or other suitable feedback signal. The control software routines can be coded to translate the digitized feedback signal into a current or power level, e.g., using Ohm's law, or by sampling a voltage feedback directly. The results are digitized (e.g. with an ADC) and then fed into fast (short-term) and slow (long-term) filters, using relatively shorter and longer time-averaging or sampling windows to determine and update the short-term and long-term averages, respectfully.

The short and long-term running averages (fast and slow filter signals) are responsive to transients; e.g., containing one multiple hyper-polarization events. At Block 750, the processor compares short-term sample readings that reflect relatively sudden or "drastic" changes in skin resistances (either increasing or decreasing resistance), as compared to the previous (short-term) sample average.

For example, the previous and current or new averages can be based on first and second series of feedback signals, which may be distinct and consecutive in time, or at least partially overlapping. The change in the feedback signal can then be defined by a difference between average values of first and second series of feedback signals, where the change exceeds a predefined threshold. The averages can be simple or weighted, for example to weight earlier signals with respect to later signals, or with all signals in the respective series having the same weight.

Both skin and waveform properties, as well as changes in current control ("throttle") position, can affect the magnitude of the difference in average values, responsive to hyper-polarization events and other transients. An additional long-term average comparison (block 755) can be used to identify conditions where the skin resistance relatively rapidly increases, or other related conditions occur that may cause the short-term sample average to fall below the long-term average.

For example, the change in the feedback signal can be further defined by the new average value (e.g., based on the second series of feedback signals) being less than an average value of a third series of the feedback signals, wherein the third series is longer than the second series and at least partially overlaps both the first and the second series. In this event, the software control loop can be configured to minimize the throttle position (block 740), in order to prevent or reduce the potential for a significant surge in skin current. At block 730, the process 700 can further enhance the control loop by incorporating motion sensor (velocity or accelerometer) readings or pressure sensor readings (responsive to force on an electrode surface), which can indicate removal of the device from the skin, which can also cause or contribute to hyper-polarization events.

Device and Process Applications

Figure 8:
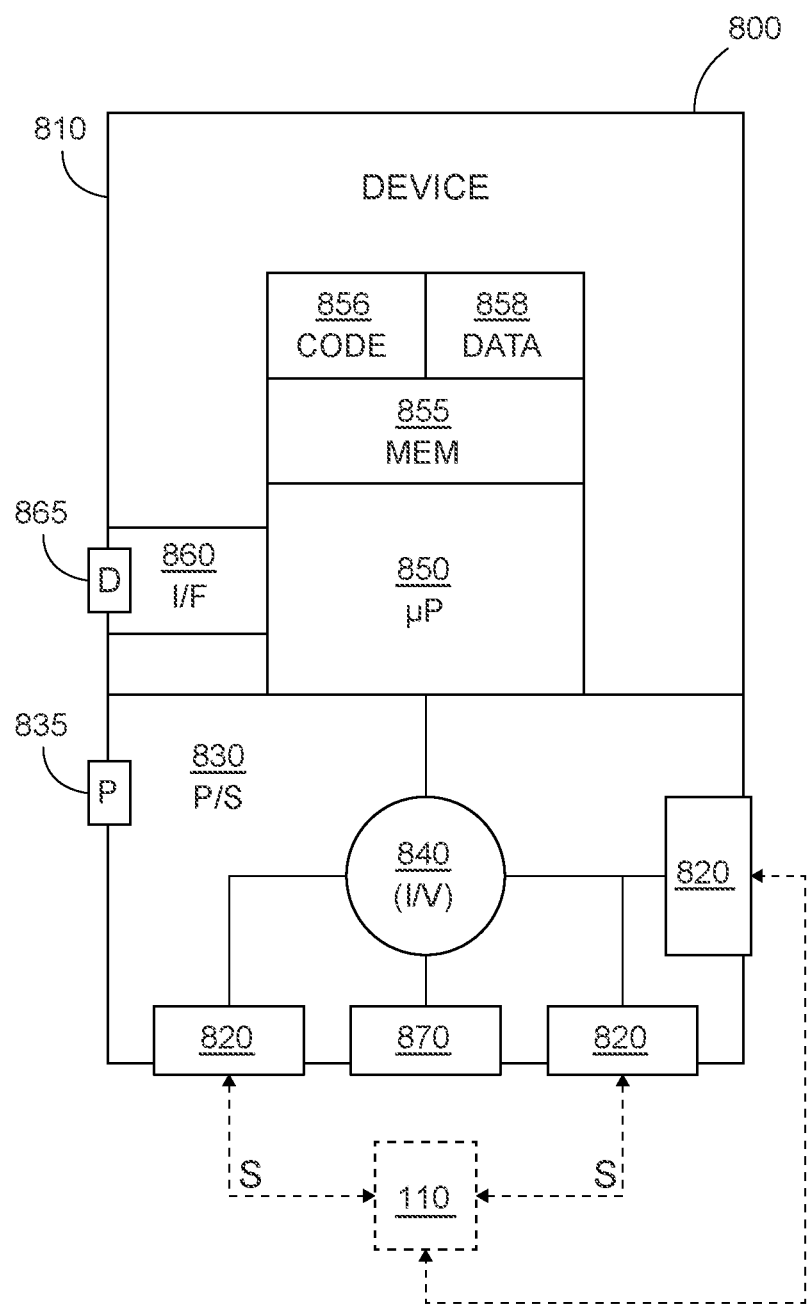
FIG. 8 is a block diagram of a representative skin treatment device with continuous current control.

FIG. 8 is a block diagram of a representative skin treatment device 800 having a housing 810 with one or more electrodes or emitters 820. Electrodes 820 are adapted to provide an electrical stimulus S to the skin 110 of a subject, for example according to a device 100 as shown in FIG. 1.

As shown in FIG. 8, microcurrent device 800 also includes a power supply (P/S) 830, a current or voltage source (IV) 840 electrically connected to one or more of the electrodes 820, a microprocessor (μP) based controller 850 with memory 855 and an external communications interface (I/F) 860.

Power supply 830 can be provided in the form of a rechargeable capacitor or battery system, for example with a power port (P) 835 adapted for external wired or wireless (e.g., inductive) charging. The microprocessor controller 850 is provided in data communication with the memory 855, which provides storage for control code 856 and operational data 858. The communications interface (I/F) 860 can be adapted for both data and control communications with the controller 850, for example using a hard-wired communication port or wireless communications device (D) 865.

In operation of device 800, power supply 830 provides power to the voltage or current generator (or source) 840, as well as the microprocessor controller 850, memory 855 and interface 860. Controller 850 is configured regulate the potential (V) or current (I) signal generated by source 840, for example by executing control code 856 stored in memory 855.

Control parameters and other operational data 858 can be used for modulating the signal provided to each selected electrode or emitter 820, in order to deliver the desired microcurrent pulse waveform, TENS, or galvanic signal. The controller 850 can also be provided as a control circuit adapted for constant power modulation, for example as described according to control circuit 500 of FIG. 5.

Depending on embodiment, the device 800 can include a plurality of at least two electrodes 820 adapted for application of a current signal to a skin surface of a subject, and a voltage or current source 840 configured to generate the current signal for application via the at least two electrodes (e.g., a galvanic source or waveform generator), where power is output to the surface of the skin 110.

The controller/microprocessor 850 can be configured to modulate the power output to the surface of the skin 110, for example including a monitor circuit configured to generate a feedback signal responsive to a change in the current signal (or the power output to the surface of the skin 110), where the change is associated with a comfort level of the subject, based on the power output. For example, the change can be associated with a decrease in the comfort level, or with a likelihood of discomfort, based at least in part on a voltage detected at, proximate or across one or more of the electrodes with sensor 870. Additional sensors 870 can also be incorporated into device 800, for example one or more acceleration or velocity sensors, pressure sensors or temperature sensors, as described herein, or any combination thereof.

The controller can be provided as a control circuit 850 including a level controller configured to modulate the current within a predefined range (e.g., a predefined comfort range); e.g., based on the feedback signal according to control circuit 500 of FIG. 5. The level controller can be coupled to a current control device configured to modulate the current, for example to the gate of a three-terminal current control device coupled between the monitor circuit and one or more of the electrodes. The level control can thus define a response curve of the current control device, within the predefined range.

The control circuit 850 can be configured to modulate or adjust the current signal to an adjusted, lower or minimum value within the predefined comfort range, responsive to a predefined change in the current signal, or a change in the power output to the surface of the skin 810. The change can be associated with a decrease in the comfort level, or a likelihood of discomfort. Thereafter, control circuit 850 can be responsive to detecting, from an average of samples of the voltage sensed or detected by the monitor circuit, at, adjacent or across one or more of the electrodes 820, and after modulation to the adjusted, lower current signal value, such that the then-current signal or the power output to the skin surface is no longer associated with a likelihood of discomfort, in which case the control circuit 850 can be configured to modulate the current to an adjusted, higher or maximum current value within the predefined comfort range, if such a value is available within the comfort range.

Figure 9:
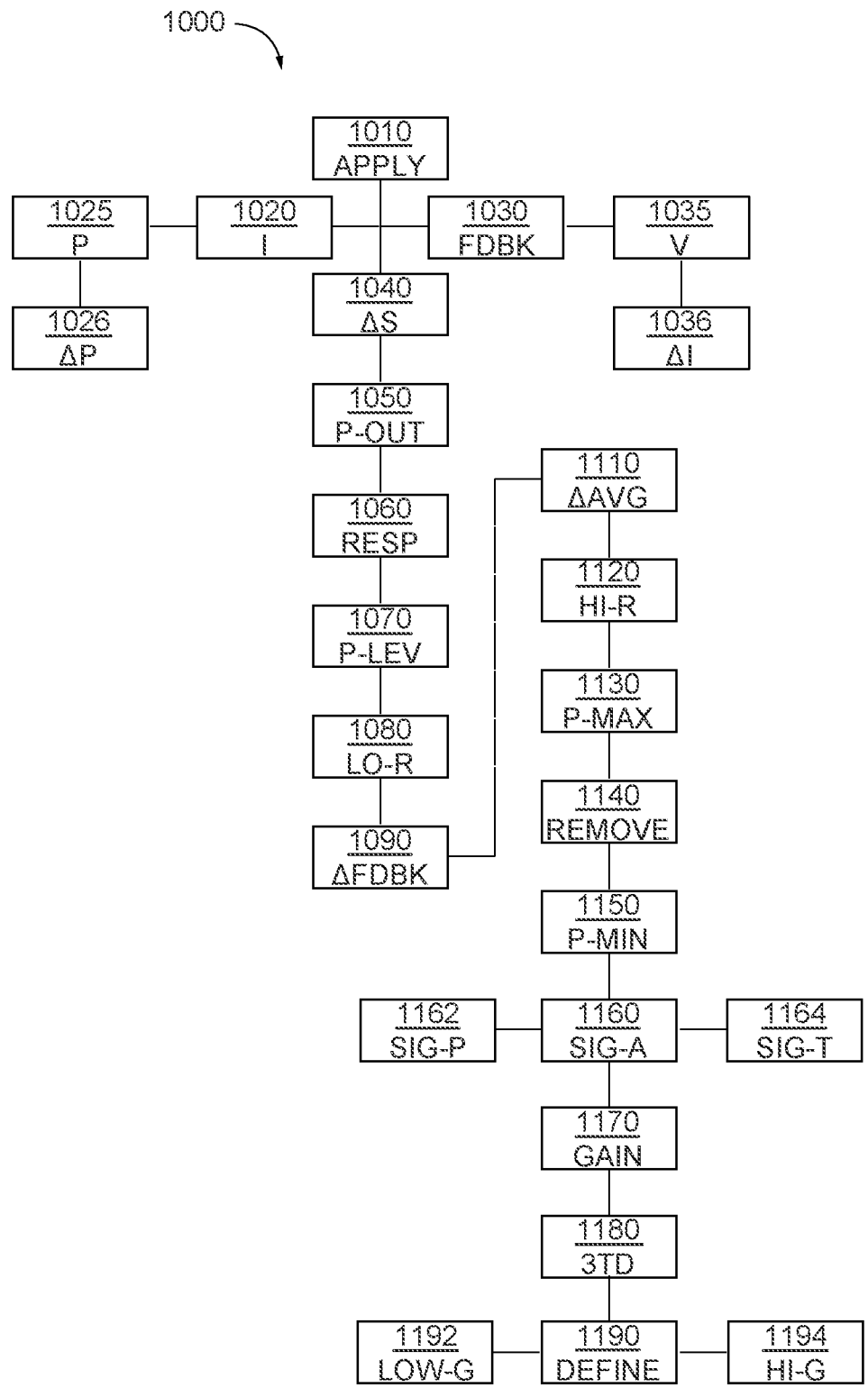
FIG. 9 is a block diagram of a method for current control; e.g., for operation of a device according to FIG. 8.

FIG. 9 is a block diagram of a method 1000 for current control; e.g., for operation of a device 800 according to FIG. 8. Methods 1000 of operating a device according to any of the above examples are also included, as well as a non-transitory computer-readable medium with program code stored thereon, where the program is code executable on a computer processor or controller to operate a device according to any of the above examples.

A skin treatment device 800 can be provided as described herein, with any combination of the disclosed features. A control circuit 850 can be configured for modulating power delivered by one or more electrodes 820 as described herein, including any combination of the disclosed features. A method 1000 can be practiced for modulating power delivered by one or more such electrodes 820 as described herein, including any combination of the disclosed features.

A method 1000 of operating a device comprises one or more electrodes adapted for application of a current signal (S) to a skin surface of a subject (1010), a voltage or current source configured to generate the current (I) signal (1020) for application via one or more of the electrodes, where power (P) is output to the skin surface (1025), and a controller configured to modulate the power output (ΔP) to the skin surface (1026). The controller comprises a monitor circuit configured to generate a feedback (FDBK) signal (1030) responsive to a change in the current signal or the power output to the skin surface, based at least in part on a voltage (V) sensed proximate one or more of the electrodes (1035), and a control circuit configured to modulate (ΔI) the current (1036), based on the feedback signal (FDBK).

The control circuit comprises a non-linear current control device adapted to modulate changes in the current signal (ΔS) applied to the skin surface (1040), based on the feedback signal (FDBK). The current control device comprises one or more of a transistor, a field effect transistor, or a junction-gate field effect transistor. The current control device comprises a first terminal coupled to the one or more electrodes, a second terminal coupled to the monitor circuit, and a gate coupled to the control circuit.

The monitor circuit comprises a voltage sensor coupled to the second terminal of the current control device and the control circuit is configured to convert the voltage sensed at the second terminal (V) to the current signal or power (P-OUT) output (1050). The control circuit comprises a level control coupled to the gate of the current control device, where the level control defines a response curve (RESP) of the current control device (1060) based on a change in the voltage, the current signal, or the power output.

The level control is configured to define the response curve (RESP) between predetermined minimum and maximum power (P-LEV) levels (1070), based on the feedback signal (FDBK) from the monitor circuit. The level control is configured to lower the response curve (LO-R) of the three-terminal device to or toward the predetermined minimum power level (1080), based on a change in the feedback signal (ΔFDBK).

The change in the feedback signal (ΔFDBK) is defined (1090) by a difference between average values (AVG) of first and second series of the feedback signals exceeding a predefined threshold. The first and second series of feedback signals are at least partially overlapping, or in consecutive order. The change in the feedback signal is further defined (1110) by the average value of the second series of feedback signals being less than an average value of a third series of the feedback signals (ΔAVG), wherein the third series is longer than the second series and at least partially overlaps both the first and the second series.

The level control is configured to raise the response curve (HI-R) of the three-terminal device to or toward the predetermined maximum power level (1120), based on an absence of the change. The control circuit is configured to raise the response curve iteratively toward the predetermined maximum (P-MAX) value (1130), based on a continued absence of the change.

The feedback signal (FDBK) is responsive to removal of the device from the skin surface of the subject (1140). The control circuit is configured to lower the response curve to or toward the minimum (P-MIN) value (1150) based on the removal of the device from the skin surface of the subject.

The feedback signal is further based on one or more of an accelerometer or velocity sensor signal (SIG-A) responsive to a speed of the device with respect to the skin surface (1160), a pressure signal (SIG-P) responsive to a force on one or more of the electrodes from the skin surface (1162), and a temperature signal (SIG-T) responsive to a temperature at or adjacent the skin surface (1164). The voltage or current source is coupled to a first of the electrodes and the control circuit is configured to modulate the current by defining a gain curve (GAIN) at a second of electrodes (1170), based on the feedback signal.

The control circuit is configured to define the gain curve at a non-linear device or three-terminal control device (3TD) coupled to the second electrode (1180); e.g. operating according to FIG. 4 and the control circuit 500 of FIG. 5, with a suitable three-terminal or nonlinear control device 524. The control circuit is configured to define the gain curve at one of a plurality of discrete values (1190) between a minimum value of the gain curve (G-MIN) and a maximum value of the gain curve (G-MAX), based on the feedback signal (FDBK). The control circuit is configured to lower the gain curve (LOW-G) responsive to a predefined change in the feedback signal (1192) and to raise the gain curve (HI-G) responsive to an absence of the predefined change in the feedback signal (1194), respectively, based on operating conditions.

The control circuit 500 of FIG. 5 is thus configured for modulating power delivered by one or more electrodes using a control device 424 operating according to FIG. 4, and as described in method 1000.

EXAMPLES

A device can be provided with one or more electrodes adapted for application of a current signal to a skin surface of a subject. A voltage or current supply source can be configured to generate the current signal for application via one or more of the electrodes; e.g., where power is output to the skin surface.

A controller can be configured to modulate the power output to the skin surface; e.g., with a monitor circuit configured to generate a feedback signal responsive to a change in the current signal or the power output to the skin surface, based at least in part on a voltage detected at or across one or more of the electrodes. A control circuit can be configured to modulate the current, based on the feedback signal.

The control circuit can include a non-linear current control device adapted to modulate changes in the current applied to the skin surface, based on the feedback signal. The non-linear current control device can include one or more of a transistor, a field effect transistor, and/or a junction-gate field effect transistor.

The non-linear current control device can include a three-terminal device coupled to one or more of the electrodes. The control circuit can include a level control coupled to a gate of the three-terminal device; e.g., where the level control defines a response curve of the three-terminal device.

The monitor circuit can include a voltage sensor responsive to the voltage detected at or across one or more of the electrodes; e.g., where the control circuit is adapted to convert the voltage to the current signal or the power output. The level control can be responsive to a change in the voltage, the current signal, or the power output. The level control can be configured to define the response curve of the three-terminal device between predetermined minimum and maximum power levels, based on the feedback signal from the monitor circuit.

The level control can be configured to lower the response curve of the three-terminal device to or toward the predetermined minimum power level, based on a change in the feedback signal. The change in the feedback signal can be defined, e.g., by a difference between average values of first and second series of the feedback signals exceeding a predefined threshold. The first and second series of feedback signals can be at least partially overlapping, or in consecutive order.

The change in the feedback signal can be further defined by the average value of the second series of feedback signals being less than an average value of a third series of the feedback signals; e.g., where the third series is longer than the second series, and/or at least partially overlaps both the first and the second series.

The level control can be configured to raise the response curve of the three-terminal device to or toward the predetermined maximum power level; e.g., based on an absence of the change. The control circuit can be configured to raise the response curve iteratively toward the predetermined maximum value; e.g., based on a continued absence of the change.

The feedback signal can be responsive to removal of the device from the skin surface of the subject, e.g., based on a change in the feedback signal. The control circuit can be configured to lower the response curve to or toward the minimum value, based on the removal of the device.

The feedback signal can further be based on one or more of an accelerometer or velocity sensor signal responsive to a speed of the device with respect to the skin surface, a pressure signal responsive to a force on one or more of the electrodes from the skin surface, and a temperature signal responsive to a temperature at or adjacent the skin surface.

The voltage or current source can be coupled to a first of the electrodes, and the control circuit can be configured to modulate the current by defining a gain curve at a second of electrodes, based on the feedback signal. For example, the control circuit can be configured to define the gain curve at a non-linear device or three-terminal device coupled to the second electrode.

The control circuit can be configured to define the gain curve at one of a plurality of discrete values between a minimum value of the gain curve and a maximum value of the gain curve, based on the feedback signal. For example, the control circuit can be configured to lower the gain curve responsive to a predefined change in the feedback signal, and to raise the gain curve responsive to an absence of the predefined change in the feedback signal.

Methods of operating a device according to any of the above examples are also included, as well as a non-transitory computer-readable medium with program code stored thereon, where the program is code executable on a computer processor or controller to operate a device according to any of the above examples.

A skin treatment device can be provided as described herein, with any combination of the disclosed features. A control circuit can be configured for modulating power delivered by one or more electrodes as described herein, including any combination of the disclosed features. A method can be practiced for modulating power delivered by one or more such electrodes as described herein, including any combination of the disclosed features.

A device can be provided with a plurality of electrodes adapted for application of a current signal to a skin surface of a subject. A voltage or current source can be configured to generate the current signal for application via the electrodes; e.g., where power is output to the skin surface.

A controller can be configured to modulate the power output to the skin surface; e.g., with a monitor circuit configured to generate a feedback signal responsive to a change in the current signal or the power output, based at least in part on a voltage sensed at, proximate or across one or more of the electrodes. The controller can include a control circuit configured to modulate the current within a predefined range, based on the feedback signal.

The plurality of electrodes can include two or more electrodes configured for electrical contact with the skin surface. The plurality of electrodes can include at least one electrode configured for electrical contact with the skin surface and at least one other electrode configured for electrical contact with a hand or other body portion of the subject, spaced from the skin surface.

The feedback signal can be responsive to an average sample of the voltage values detected at, proximate, or across one or more of the electrodes. The change in the current signal or output power can be associated with a comfort level of the subject; e.g., with the comfort level being responsive to the power output to the skin surface.

The control circuit can include a power level control configured to adjust the current signal to a lower or minimum value within the predefined range; e.g., responsive to the change being associated with a decrease in the comfort level. The power level control can be configured to adjust the current signal to a higher or maximum value within the predefined range; e.g., responsive to the change being associated with an increase in the comfort level, or an absence of a decrease in the comfort level. For example, the control circuit can be coupled to the gate of a three-terminal device coupled between the monitor circuit and one or more of the electrodes, and configured to define a power level setting a gain curve of the three-terminal device between predefined maximum and minimum ranges.

In any of these examples and embodiments, a skin treatment device can be provided with one or more electrodes adapted for application of a current signal to a skin surface of a subject, a voltage or current source configured to generate the current signal for application via one or more of the electrodes, where power is output to the skin surface, and a controller configured to modulate the power output to the skin surface. The controller can include a monitor circuit configured to generate a feedback signal responsive to a change in the current signal or the power output to the skin surface, based at least in part on a voltage sensed proximate one or more of the electrodes, and a control circuit with a control device coupled to one or more of the electrodes, and configured to modulate changes in the current signal, based on the feedback signal.

In any of these examples and embodiments, the control device can include a first terminal coupled to the one or more of the electrodes, a second terminal coupled to the monitor circuit, and a gate coupled to the control circuit. For example, the control device can comprise or include one or more of a transistor, a field effect transistor, or a junction-gate field effect transistor.

In any of these examples and embodiments, the monitor circuit can include a voltage sensor coupled to the second terminal of the control device; e.g., where the feedback signal comprises the voltage sensed by the voltage sensor at the second terminal, proximate the one or more of the electrodes. The control circuit can include a level control (or level control circuit) coupled to the gate of the control device; e.g., where the level control defines a response curve of the control device based on a change in the voltage, the current signal, or the power output.

In any of these examples and embodiments, the monitor circuit or level control can be configured to define the response curve between predetermined minimum and maximum power levels, based on the feedback signal from the monitor circuit. For example, the level control can be configured to lower the response curve to or toward the predetermined minimum power level, based on a change in the feedback signal.

The change in the feedback signal can be defined by a difference between average values of first and second series of the feedback signals exceeding a predefined threshold. The first and second series of feedback signals may be at least partially overlapping, or in consecutive order. The change in the feedback signal can be further defined by the average value of the second series of feedback signals being less than an average value of a third series of the feedback signals; e.g., where the third series is longer than the second series and at least partially overlaps both the first and the second series. The change in the feedback signal may also be responsive to removal of the device from the skin surface of the subject.

In any of these examples and embodiments, the control circuit can be configured to raise the response curve of the three-terminal device to or toward the predetermined maximum power level, based on an absence of change in the feedback signal. The control circuit can be configured to raise the response curve iteratively toward the predetermined maximum power level, based on a continued absence of the change.

In any of these examples and embodiments, the feedback signal can be further based on one or more of an accelerometer or velocity sensor signal responsive to a speed of the device with respect to the skin surface, a pressure signal responsive to a force on one or more of the electrodes from the skin surface, and a temperature signal responsive to a temperature at or adjacent the skin surface. The control circuit can be configured to modulate the current signal by defining a gain curve at the control device, based on the feedback signal; e.g., where the voltage or current source is coupled to one or more others of the electrodes, spaced from the one or more of the electrodes coupled to the control device.

In any of these examples and embodiments, the control circuit can be configured to define the gain curve between a minimum value of the gain curve and a maximum value of the gain curve, based on the feedback signal. The control circuit can be configured to lower the gain curve responsive to a predefined change in the feedback signal, to raise the gain curve responsive to an absence of the predefined change in the feedback signal, or both.

A method is provided for operating a device according to any of the examples and embodiments herein. A non-transitory computer-readable medium can be provided with program code stored thereon, the program code being executable on a computer processor or controller system to operate a device according to claim 1.

In any of these examples and embodiments, a skin treatment device can be provided with a plurality of electrodes adapted for application of a current signal to a skin surface of a subject, and a voltage or current source configured to generate the current signal for application via one or more of the electrodes; e.g., where power is output to the skin surface. A controller can be configured to modulate the power output to the skin surface, for example with a monitor circuit configured to generate a feedback signal responsive to a change in the current signal or the power output to the skin surface based at least in part on a voltage sensed at, proximate or across one or more of the electrodes, and a control circuit configured to modulate the current signal within a predefined range, based on the feedback signal.

In any of these examples and embodiments, the plurality of electrodes can include two or more electrodes configured for electrical contact with the skin surface; e.g., where the current signal is delivered to the skin surface between the two electrodes. At least one electrode can be configured for electrical contact with the skin surface, with at least one other electrode configured for electrical contact with a hand or other body portion of the subject, spaced from the skin surface; e.g., where the current signal is delivered to the skin surface between the at least one electrode in electrical contact with the skin surface and the at least one other electrode, spaced from the skin surface.

In any of these examples and embodiments, the change in the current signal or output power may be associated with a comfort level of the subject; e.g., where the comfort level is responsive to the power output to the skin surface. The control circuit can include a power level control (o control circuit) configured to adjust the current signal to a lower or minimum value within the predefined range, responsive to the change being associated with a decrease in the comfort level. The power level control (or control circuit) can be configured to adjust the current signal to a higher or maximum value within the predefined range; e.g., responsive to the change being associated with an increase in the comfort level, or an absence of a decrease in the comfort level.

This disclosure has been made with respect to representative examples and embodiments. Each and every example embodiment of the invention disclosed here can be used either alone or in combination with any other embodiment or example that is described or illustrated herein, and each may incorporate additional modifications, changes, equivalents, and alternatives that fall within the breadth of disclosure, as read and understood by a person of ordinary skill, and without departing from practice of the invention as claimed. These various examples and embodiments are provided by way of illustration, and should not be construed to limit the scope of the invention, nor to limit the meets and bounds of coverage as defined by the plain language of the claims.

The invention claimed is:

1. A device comprising:
one or more electrodes adapted for application of a current signal to a skin surface of a subject;
a voltage or current source configured to generate the current signal for application via one or more of the electrodes, wherein power is output to the skin surface; and
a controller configured to modulate the power output to the skin surface, the controller comprising:
a monitor circuit configured to generate a feedback signal responsive to a change in the current signal or the power output to the skin surface, based at least in part on a voltage sensed proximate the one or more of the electrodes; and
a control circuit comprising a control device coupled to one or more of the electrodes and configured to modulate changes in the current signal, based on the feedback signal;
wherein the control device comprises a first terminal coupled to the one or more of the electrodes, a second terminal coupled to the monitor circuit, and a gate coupled to the control circuit;
wherein the control circuit comprises a level control coupled to the gate of the control device, wherein the level control defines a response curve of the control device based on a change in the voltage, the current signal, or the power output;
wherein the level control is configured to define the response curve between predetermined minimum and maximum power levels, based on the feedback signal from the monitor circuit;
wherein the level control is configured to lower the response curve to or toward the predetermined minimum power level, based on a change in the feedback signal; and
wherein the change in the feedback signal is defined by a difference between average values of first and second series of the feedback signal exceeding a predefined threshold.

2. The device of claim 1, wherein the control device comprises one or more of a transistor, a field effect transistor, or a junction-gate field effect transistor.

3. The device of claim 1, wherein the monitor circuit comprises a voltage sensor coupled to the second terminal of the control device, wherein the feedback signal comprises the voltage sensed proximate the one or more of the electrodes, by the voltage sensor.

4. The device of claim 1, wherein:
the first and second series of the feedback signal are at least partially overlapping, or in consecutive order;
the change in the feedback signal is further defined by the average value of the second series of the feedback signal being less than an average value of a third series of the feedback signal, wherein the third series is longer than the second series and at least partially overlaps both the first and the second series; or
the change in the feedback signal is responsive to removal of the device from the skin surface of the subject.

5. The device of claim 1, wherein:
the control device comprises a three-terminal device having the first terminal, the second terminal and the gate; and
the control circuit is configured to raise the response curve as defined by the three-terminal device to or toward the predetermined maximum power level, based on an absence of change in the feedback signal.

6. The device of claim 5, wherein the control circuit is configured to raise the response curve iteratively toward the predetermined maximum power level, based on a continued absence of the change.

7. The device of claim 1, wherein the feedback signal is further based on one one or more of an accelerometer or velocity sensor signal responsive to a speed of the device with respect to the skin surface, a pressure signal responsive to a force on one or more of the electrodes from the skin surface, and a temperature signal responsive to a temperature at or adjacent the skin surface.

8. The device of claim 1, wherein:
the control circuit is configured to modulate the current signal by defining a gain curve at the control device, based on the feedback signal, and
the voltage or current source is coupled to one or more others of the electrodes, different from and spaced from the one or more of the electrodes to which the control device is coupled.

9. The device of claim 8, wherein the control circuit is configured to:
define the gain curve between a minimum value of the gain curve and a maximum value of the gain curve, based on the feedback signal; or
lower the gain curve responsive to a predefined change in the feedback signal and raise the gain curve responsive to an absence of the predefined change in the feedback signal.

10. A method of operating a device according to claim 1.

11. A non-transitory computer-readable medium with program code stored thereon, the program code executable on a computer processor to operate a device according to claim 1.

12. A skin treatment device comprising:
- a plurality of electrodes adapted for application of a current signal to a skin surface of a subject;
- a voltage or current source configured to generate the current signal for application via one or more of the electrodes, wherein power is output to the skin surface; and
- a controller configured to modulate the power output to the skin surface, the controller comprising:
  - a monitor circuit configured to generate a feedback signal responsive to a change in the current signal or the power output to the skin surface based at least in part on a voltage sensed at, proximate or across one or more of the electrodes; and
  - a control circuit configured to modulate the current signal within a predefined range, based on the feedback signal;
- wherein the control circuit comprise a control device that comprises a first terminal coupled to the one or more of the electrodes, a second terminal coupled to the monitor circuit, and a gate coupled to the control circuit;
- wherein the control circuit comprises a level control coupled to the gate of the control device, wherein the level control defines a response curve of the control device based on a change in the voltage, the current signal, or the power output;
- wherein the level control is configured to define the response curve between predetermined minimum and maximum power levels, based on the feedback signal from the monitor circuit;
- wherein the level control is configured to lower the response curve to or toward the predetermined minimum power level, based on a change in the feedback signal; and wherein the change in the feedback signal is defined by a difference between average values of first and second series of the feedback signal exceeding a predefined threshold.

13. The device of claim 12, wherein the plurality of electrodes comprise:
- two or more electrodes configured for electrical contact with the skin surface, wherein the current signal is delivered to the skin surface between the two or more electrodes; or
- at least one electrode configured for electrical contact with the skin surface and at least one other electrode configured for electrical contact with a hand or other body portion of the subject, spaced from the skin surface, wherein the current signal is delivered to the skin surface between the at least one electrode in electrical contact with the skin surface and the at least one other electrode, spaced from the skin surface.

14. The device of claim 13, wherein the control device comprises a three-terminal device having the first terminal, the second terminal, and the gate, and defining the response curve.

15. The device of claim 12, wherein the change in the current signal or output power is associated with a comfort level of the subject, responsive to the power output to the skin surface.

16. The device of claim 15, wherein the control circuit comprises a power level control configured to:
- adjust the current signal to a lower or minimum value within the predefined range, responsive to the change in the current signal or output power being associated with a decrease in the comfort level; or
- adjust the current signal to a higher or maximum value within the predefined range, responsive to the change in the current signal or output power being associated with an increase in the comfort level, or an absence of a decrease in the comfort level.

* * * * *